(12) United States Patent
Nowotny et al.

(10) Patent No.: US 8,809,730 B2
(45) Date of Patent: Aug. 19, 2014

(54) MODULAR SYSTEM FOR SURFACE WELDING INNER SURFACES OF WORKPIECES, COMPRISING A LASER BEAM AND MULTIPLE MODULES

(75) Inventors: Steffen Nowotny, Radabeul (DE); Siegfried Scharek, Dresden (DE); Frank Kublech, Dresden (DE); Friedrich Kempe, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 427 days.

(21) Appl. No.: 13/376,906

(22) PCT Filed: Jun. 3, 2010

(86) PCT No.: PCT/DE2010/000666
§ 371 (c)(1),
(2), (4) Date: Feb. 22, 2012

(87) PCT Pub. No.: WO2010/142283
PCT Pub. Date: Dec. 16, 2010

(65) Prior Publication Data
US 2012/0261393 A1    Oct. 18, 2012

(30) Foreign Application Priority Data
Jun. 11, 2009  (DE) .................. 10 2009 024 957

(51) Int. Cl.
*B23K 26/34* (2014.01)
*B23K 26/14* (2014.01)

(52) U.S. Cl.
CPC ............ *B23K 26/34* (2013.01); *B23K 26/14* (2013.01); *B23K 26/1464* (2013.01); *B23K 26/1482* (2013.01)
USPC ................................... 219/121.63

(58) Field of Classification Search
CPC ............... B23K 26/14; B23K 26/1464; B23K 26/1482; B23K 26/34
USPC ............................ 219/121.63, 121.64, 121.84
See application file for complete search history.

(56) References Cited

U.S. PATENT DOCUMENTS

4,804,815 A * 2/1989 Everett .................... 219/121.66
6,992,263 B1 * 1/2006 Baker et al. ............. 219/121.61
(Continued)

FOREIGN PATENT DOCUMENTS

DE   10009123 A1   8/2001
DE   10116720 A1   10/2002
(Continued)

*Primary Examiner* — Samuel M Heinrich
(74) *Attorney, Agent, or Firm* — Jacobson Holman, PLLC.

(57) ABSTRACT

The invention relates to a modular system for overlay welding at inwardly disposed surfaces of workpieces using a laser beam. In this respect, a coating can be formed on inwardly disposed surfaces using a powdery welding material. It is the object of the invention to provide possibilities for the overlay welding or for the coating of inwardly disposed surfaces of workpieces with a variable immersion depth, increased flexibility and independence of direction in the processing. A feed for powdery welding material, a feed for protective gas and a feed for a coolant are present on a system in accordance with the invention. The system is formed with a coupling module for the laser beam, at least one beam guiding module for the laser beam and a processing module, which can be connected to one another. A collimated laser beam is directed via the coupling module through the beam guiding modules) onto an optical element focusing the laser beam on the surface of a workpiece to be processed. A nozzle having a discharge opening for the laser beam and the protective gas as well as a passage having a discharge opening for powdery welding material are present at the processing module.

24 Claims, 8 Drawing Sheets

(56) References Cited

U.S. PATENT DOCUMENTS

Figure 1A:
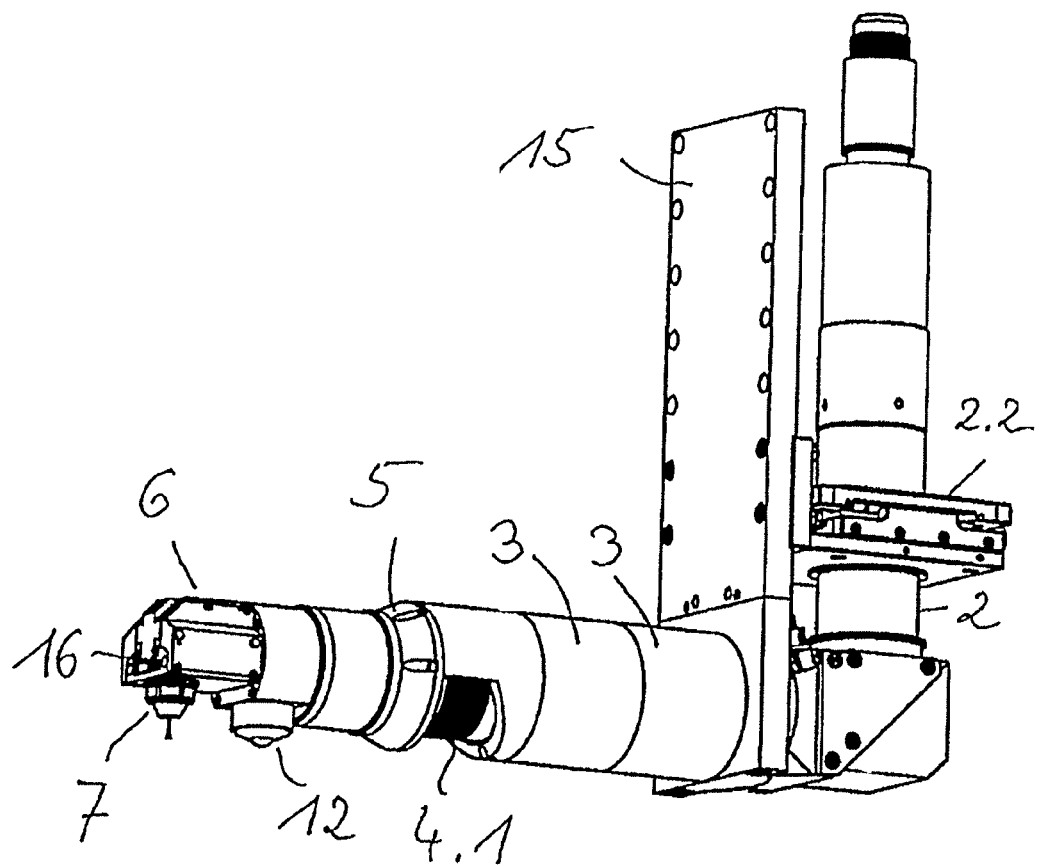

2002/0139782 A1    10/2002    Onitsuka et al.
2008/0127891 A1    6/2008    Desert et al.

FOREIGN PATENT DOCUMENTS

DE    102005058172 A1    6/2007
EP    0526322 A1    2/1993

* cited by examiner

MODULAR SYSTEM FOR SURFACE WELDING INNER SURFACES OF WORKPIECES, COMPRISING A LASER BEAM AND MULTIPLE MODULES

This is a national stage of PCT/DE10/000,666 filed Jun. 3, 2010 and published in German, which claims the priority of German number 2009 024 957.5 filed Jun. 11, 2009, hereby incorporated by reference.

The invention relates to a modular system for overlay welding at inwardly disposed surfaces of workpieces using a laser beam. In this respect, a coating can be formed on inwardly disposed surfaces using a powdery welding material. The invention can particularly preferably be used with tubular workpieces since a processing with increased immersion depth is also possible due to the modular structure. A use is, however, also possible with other geometries, also asymmetrical geometries, of workpieces having inwardly disposed surfaces which are to be processed. The processing can also take place at positions which are difficult to access.

In overlay welding using laser radiation in a general form, that is, also at freely accessible surfaces, it is customary to align the laser beam and additionally a protective gas onto the respective processing region. Powdery welding material is, as a rule, supplied from one side, but optionally also from two sides, via one or two separate powder feeds from the side. However, this induces disadvantages due to the outwardly disposed feeds which are required for this purpose and which are exposed to the heat and also to particles which are formed in overlay welding and are moved away from the workpiece. A homogeneous powder feed into the region of the focal spot on the surface of a workpiece to be processed is not easily possible in this manner.

On the processing of inwardly disposed surfaces, as is the case with pipes, a process is followed such that an apparatus used for this purpose is held statically and the pipe to be inwardly coated is rotated about its longitudinal axis in the processing and is moved in translation parallel to it. An independence of direction in the processing can thus be achieved.

Know technical solutions are also not easily suitable for the processing of different workpieces and an adaptation thereto is only possible with a very increased effort, if at all.

It is therefore the object of the invention to provide possibilities for the overlay welding or for the coating of inwardly disposed surfaces of workpieces with a variable immersion depth, increased flexibility and independence of direction in the processing.

In accordance with the invention, this object is achieved by a system having the features of claim 1. Advantageous embodiments and further developments of the invention can be achieved using features designated in the subordinate claims.

A feed for powdery welding material, a feed for protective gas and a feed for a coolant are present on a system in accordance with the invention. In addition, the system is formed with a coupling module for the laser beam, at least one beam-guiding module for the laser beam and a processing module, which can be connected to one another. A collimated laser beam is directed via the coupling module through the beam guiding module(s) onto an optical element focusing the laser beam on the surface of a workpiece to be processed. A nozzle having a discharge opening for the laser beam and the protective gas as well as at least one passage having the discharge opening for powdery welding material are present at the processing module.

The individual modules can be connected to one another at a system in accordance with the invention, which is possible with simple mechanical means. This can be achieved by e.g. a screw connection or a suitable plug-in connection with clearance. There is the possibility to use different beam guiding modules which can be replaceably connected to the two other modules already named here. Such beam guiding modules can have different lengths with respect to the longitudinal or optical axis of the laser beam which is directed by a beam guiding module to enable a variable immersion depth in the processing of different workpieces.

In order also to achieve this, however, one or more extension modules can also additionally be fastened to a system so that a further scaling up of the immersion depth becomes possible. Extension modules can likewise be used in different lengths. In this case, an extension module having a length suitable for the processing of a workpiece can be connected to the coupling module and to the beam guiding module so that it is arranged between these two modules in the processing. Two or more extension modules having respectively the same or different lengths can, however, also be arranged between the coupling module and the beam guiding module and can be connected to one another.

Modules can have a fastening or locking element with which they can be connected to a further module at at least one end face. In addition, they are designed in the interior such that the laser beam can be directed through the modules onto a processing region of a workpiece.

An element focusing the laser beam is arranged within the system. The laser beam collimated up to this point is incident onto this focusing element and is then focused, with an adapted focal length where possible, onto the surface of a workpiece to be processed. The focal length is preferably variable to be able to carry out an adaptation to differently designed and dimensioned workpieces such as an adaptation to different inner diameters of pipes.

Such a focusing element can preferably be arranged in the beam guiding module. There is, however, also the possibility of using a simultaneously focusing and reflecting element. Since a variation of the beam direction of the laser beam can be necessary in the processing of inwardly disposed surfaces, such an element reflecting the laser beam can be arranged in a processing module and the laser beam is incident onto it after it has been guided through the beam guiding module or optionally also at least through an extension module. From there it can, for example, be deflected at an angle of 90° and the beam direction can be varied accordingly. If the reflective surface of this element, which can also be called a deflection mirror, is formed as curved in a suitable shape, the laser beam can also simultaneously be focused by it.

Such an element focusing the laser beam should be positioned at the system so that a variation of the length of the system for an adaptation of the immersion depth can take place up to this position and the laser beam is collimated up to there.

To protect a reflective element which is arranged within the processing module, a protective glass optically transparent for the laser radiation can be arranged between the nozzle having the discharge opening and the passages for the welding material in the processing module. The incidence of splashes or particles onto the reflective element can be prevented by such a protective glass. Since, however, a contamination or coating of the protective glass cannot be completely avoided, it is favorable to hold a protective glass in a holding element. The holding element can be connected to the processing module. A shaft-shaped mount can be formed in the processing module for this purpose and the holding element with protective glass can be simply introduced into it and removed from it again as required. If a protective glass is contaminated by particles or splashes, it can be replaced simply and inexpensively. For this purpose, the holding element can be removed from the processing module and, in an advantageous embodiment of a holding element with two frame elements between which a protective glass can be held in a clamping manner, a contaminated protective glass can be removed after flipping the frame elements open and a new, clean one can again be inserted in place of it. The frame elements can be pivoted about an axis of rotation for this purpose.

The already addressed nozzle which can be fastened to the processing module has at least one passage by which powdery welding material can be directed onto the surface of the workpiece to be processed in the focal point of the laser beam. The one passage is, or the plurality of passages are, aligned at an angle so that powdery welding material can impact onto the surface of the workpiece to be processed in the focal point of the laser beam at an obliquely inclined angle. If a plurality of passages, preferably four passages, are present for welding material at one nozzle, they should be arranged at respectively the same angular intervals from one another about the beam axis of the laser beam and should be inclined at the same angles with respect to the beam axis. A quasi-focusing of the supplied powder stream into the focal point onto the workpiece surface can thus be achieved.

Connections for the supply of protective gas, for powdery welding material and a coolant are preferably present at the coupling module and/or beam guiding module. Passages for powdery welding material, protective gas and coolant can be guided through at least the beam guiding module and the processing module. All these three media can thus be guided in a protected manner through the system without exposed lines being present. The passages can in this respect be integrated into the outer wall of the individual modules. On the connection of the modules to one another, they can be positioned relative to one another such that the respective passage of the one module opens into the end-face end of the passage in the adjacent module.

Protective gas can thus be guided to the discharge opening of the nozzle and powdery welding material can be guided up to the passage(s) of the nozzle.

Since a separate connection for the supply is associated with each passage for welding material, different volume flows of welding material and/or welding material which is formed from a different material can also be supplied simultaneously via the individual passages. Coatings which are formed with a metal alloy or coatings containing hard materials can thus be formed, for example.

Graded coatings can, however, also be manufactured which have a different material consistence or material composition starting from the workpiece surface up to the surface of the finished coating. Multi-layer coatings having individual layers of different materials can, however, thus also be formed.

At least one support element should in particular be present at the beam guiding module and/or at an extension module, in particular on a use of a system in accordance with the invention in which a large immersion depth is required. The support element can be arranged at the outer wall of the respective module and can be placed onto the surface of the workpiece. A bending can thereby be avoided with a larger length of the system and a "carrier on two supports" can be formed with the support element in conjunction with a holder to which, for example, the coupling module, an extension module or the beam guiding module can be fastened or with two support elements arranged at a spacing from one another.

A rotatably supported ball can preferably be used as the support element. In an analog manner, however, a rotatable roll or a wheel can also be utilized as a support element. With the two last-named possibilities, it is preferred to support them rotatably about two axes aligned perpendicular to one another.

Both the support element(s) and the nozzle or parts of a nozzle should be replaceably fastened to the processing module for an adaptation to different workpiece geometries and dimensionings. An adaptation to different inner diameters of pipes can thus e.g. be carried out. A support element for such an adaptation can also be formed as telescopic or can be fastened to a telescope. In this respect, a pneumatic or hydraulic telescopic drive can also be provided.

Such nozzles should be available with one passage or with a plurality of passages for powdery welding material in which the one passage, or also the plurality of passages, can be inclined at different angles with respect to the beam axis with which the laser beam is directed onto the workpiece surface to be processed. It can thus be ensured that powdery welding material is conveyed into the focal point on the surface to be processed, even if different spacings of the workpiece surface from the beam axis of the laser beam collimated up to this point have to be considered.

A replacement of a nozzle or of parts which are components of a nozzle can, however, also take place if wear occurs since a material removal can occur at passages by an abrasive effect of powdery welding material or wear or damage can have occurred in a thermally induced manner.

In this respect, the length of the passages can also be different at the different nozzles beside the different angles of inclination.

An adaptation of the laser beam can be carried out by varying the focal length of a focusing element.

The system with the processing module and a workpiece can be moved in at least two axes relative to one another. A three-dimensional movement is, however, also possible. In contrast to the prior art, more degrees of freedom are therefore possible in the processing and thus, for the first time, a processing independent of the direction with such workpiece surfaces arranged in an inwardly disposed manner. The system in accordance with the invention can thus also additionally be rotated about the beam axis of the collimated laser beam. In this respect, the conveying direction of the powdery welding material discharged from the passages of the nozzle is admittedly changed and the effect of the force of gravity on the discharge of the powder from the individual passages of the nozzle is no longer of equal magnitude.

However, this in particular only has an insignificant effect with a nozzle having at least four passages for the powder at least up to an angle of rotation by 90°, that is, up to the horizontal, so that inwardly disposed coatings can thus also be produced with sufficient quality.

In a system in accordance with the invention, protective gas can advantageously be introduced into the beam guiding module, into an extension module or into the processing module directly after or before the element focusing the laser beam. For this purpose, an outlet can be provided from a passage for the protective gas conducted up to there into the interior. The protective gas can then be conducted past the reflective element in the processing module and past the protective glass through the discharge opening for the laser beam. The protective glass and the reflective element can thus be better protected, cleaned and also additionally cooled with the protective gas since the latter can flow directly past the critical surfaces.

A two-dimensional cross-table can be arranged at the coupling module for the adjustment of the laser beam on the entry into the system. An adjustment of the beam axis can be carried out using such an auxiliary means so that the laser beam can be positioned precisely and can be directed with a defined beam axis onto reflective elements and onto the element focusing the laser beam. A further reflective element can be arranged in the coupling module subsequent to the cross-table and the beam direction can be varied by it so that the beam direction of the laser beam emitted by a laser beam source and optionally conducted over an optical fiber can be varied such that it can be directed through the further modules onto the workpiece surface to be processed, so that it is guided exactly in the desired optical axis in so doing and so that it is incident onto the focusing element without any axial offset.

The invention will be explained in more detail by way of example in the following.

Figure 1B:
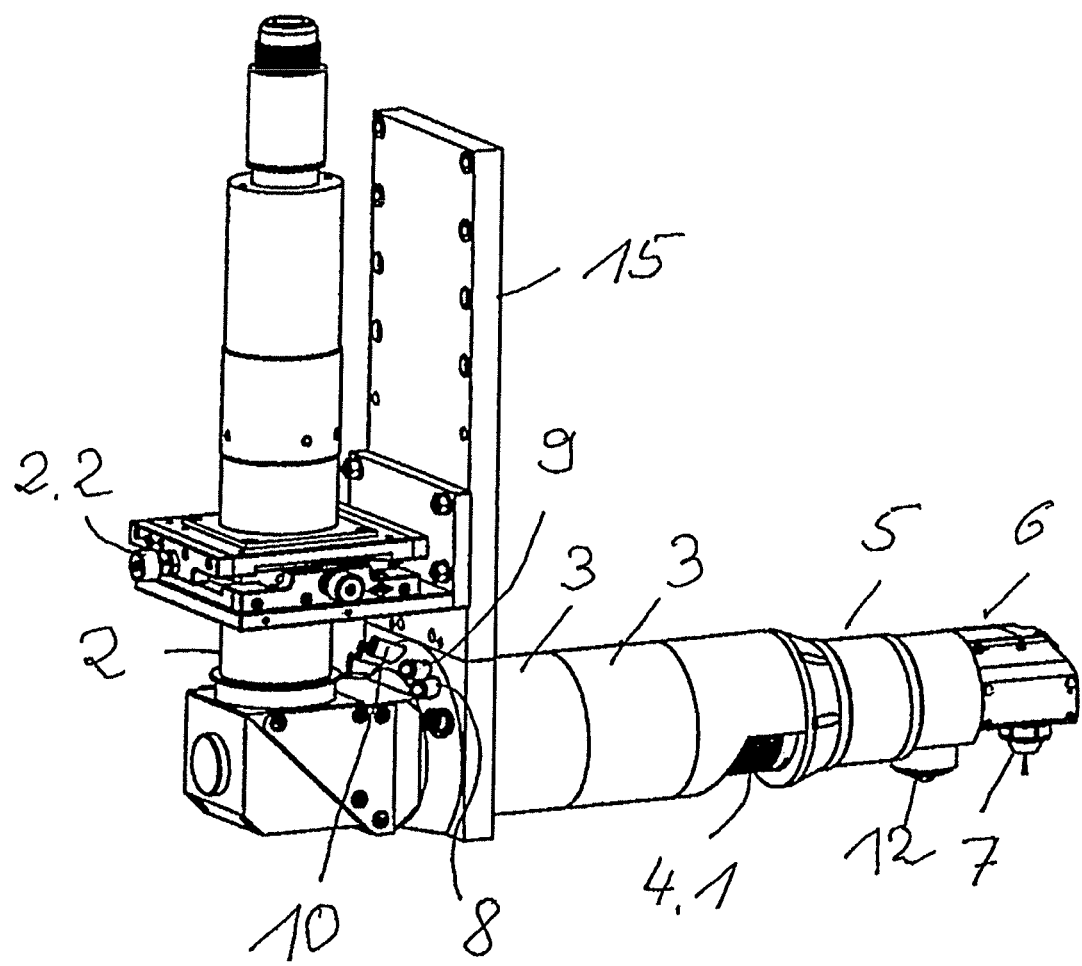
Figure 2:
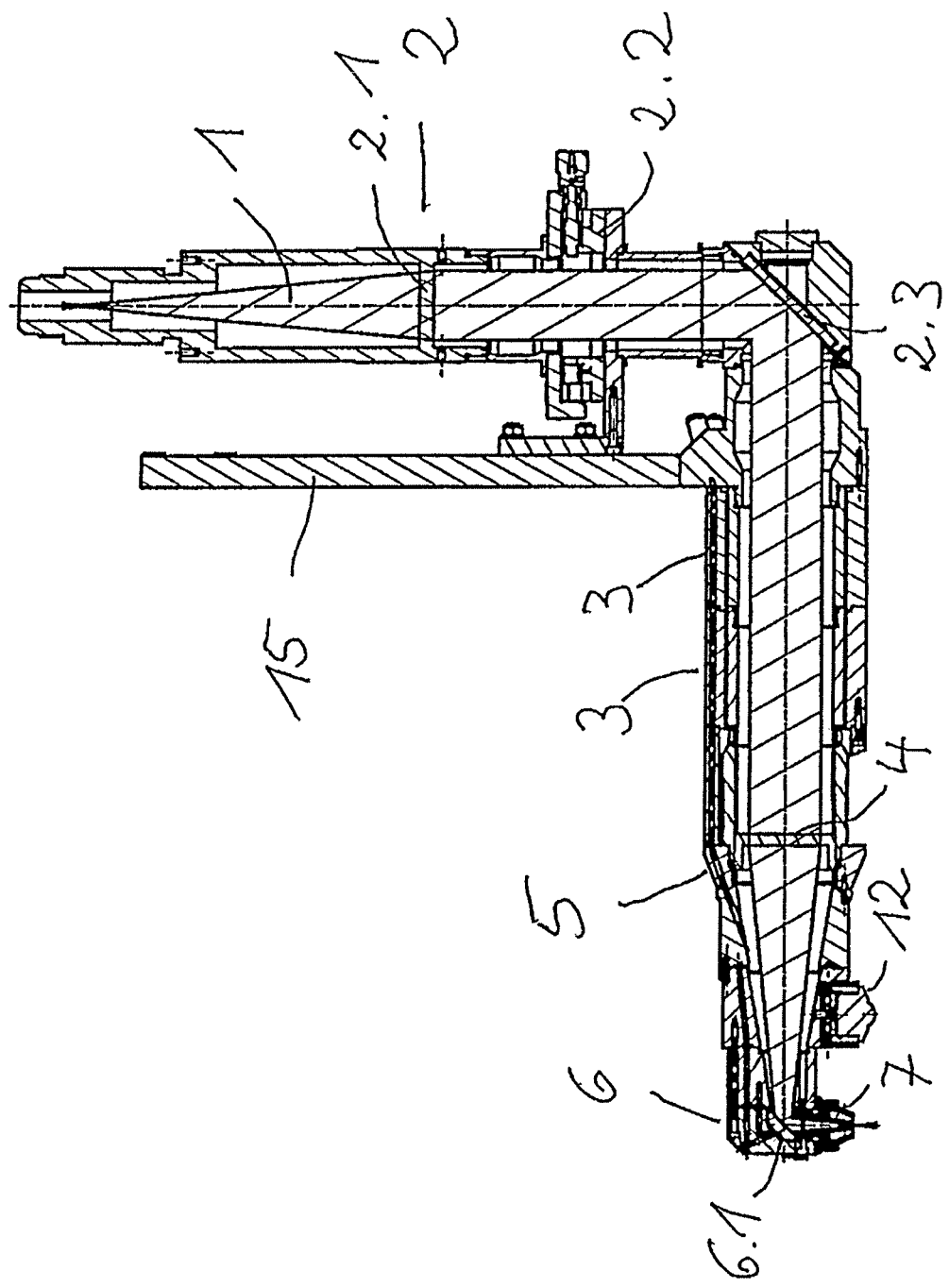
Figure 3A:
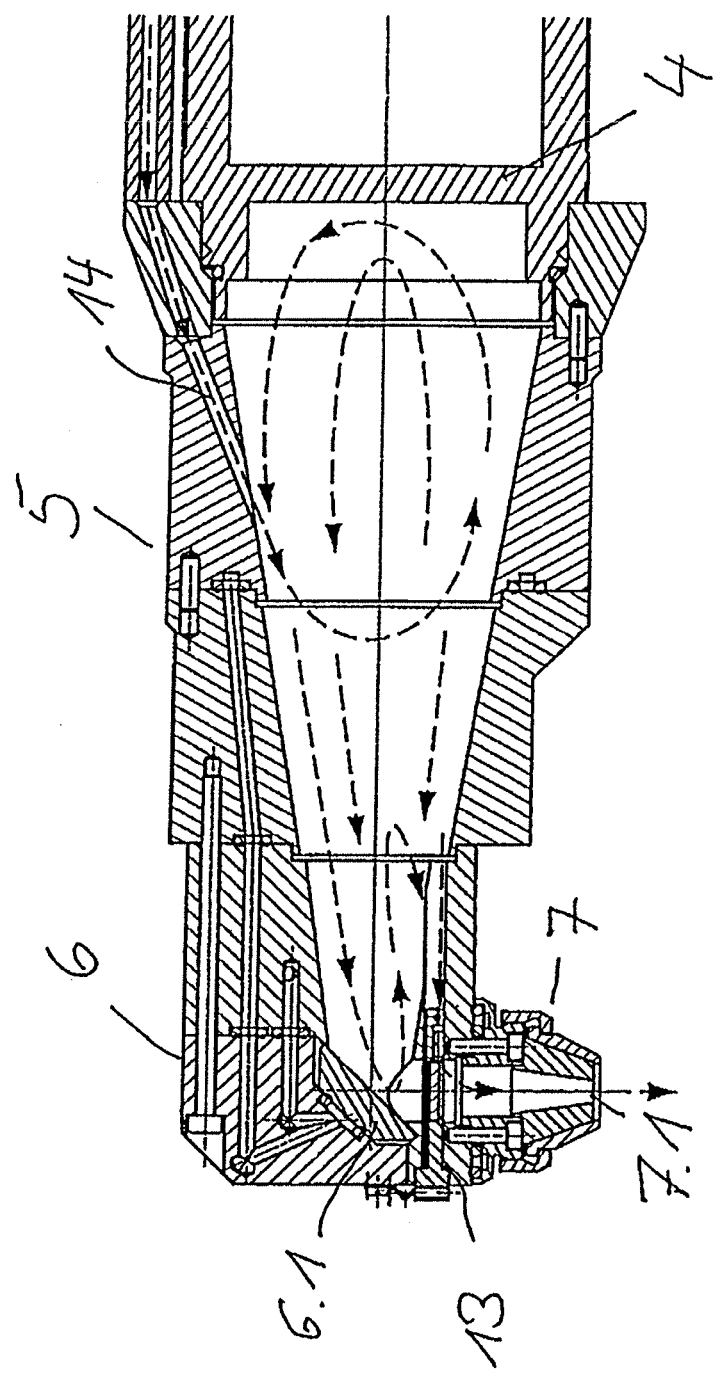
Figure 3B:
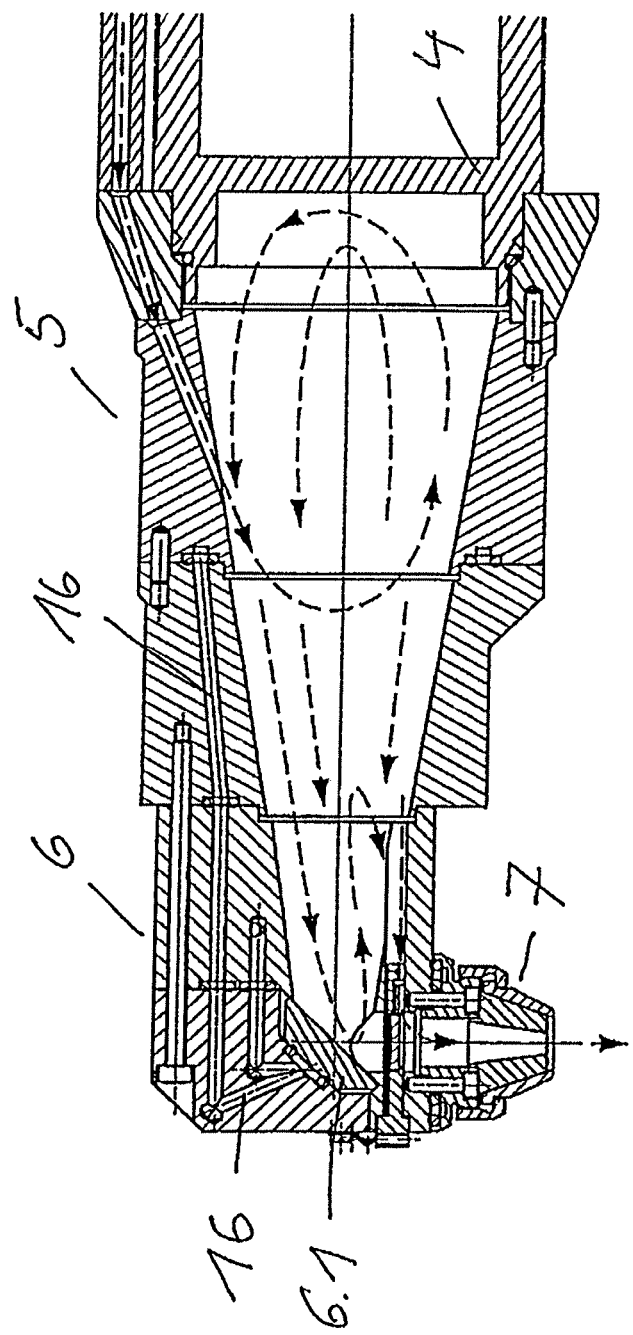
Figure 4:
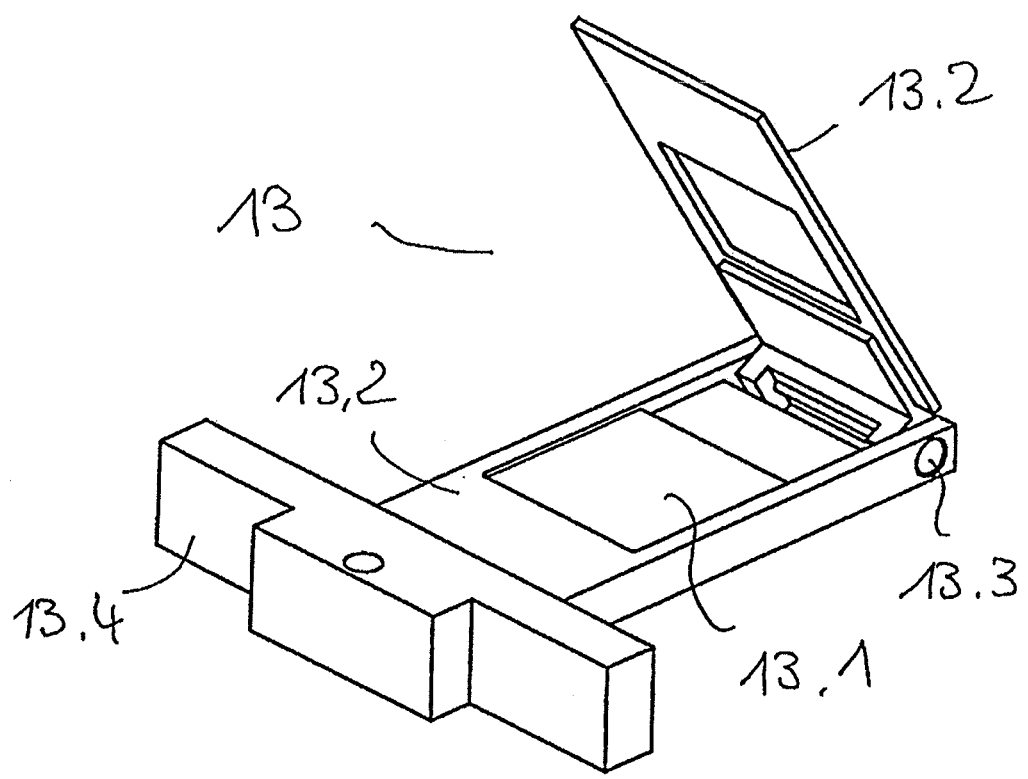
Figure 5:
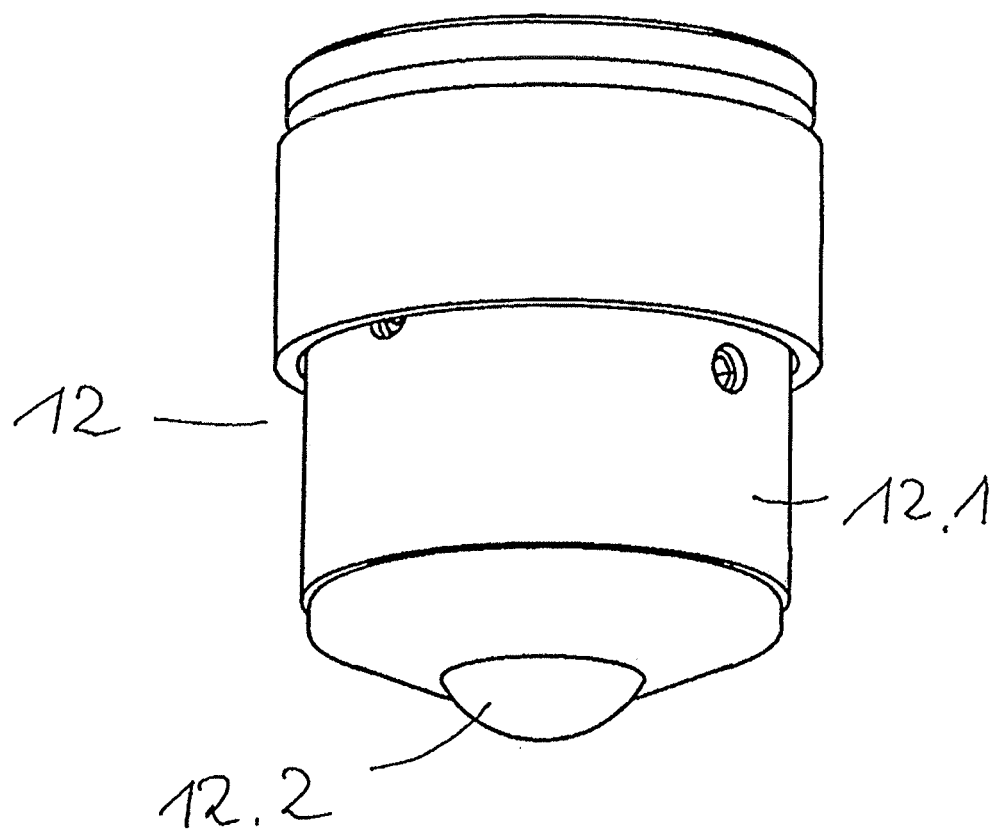
Figure 6:
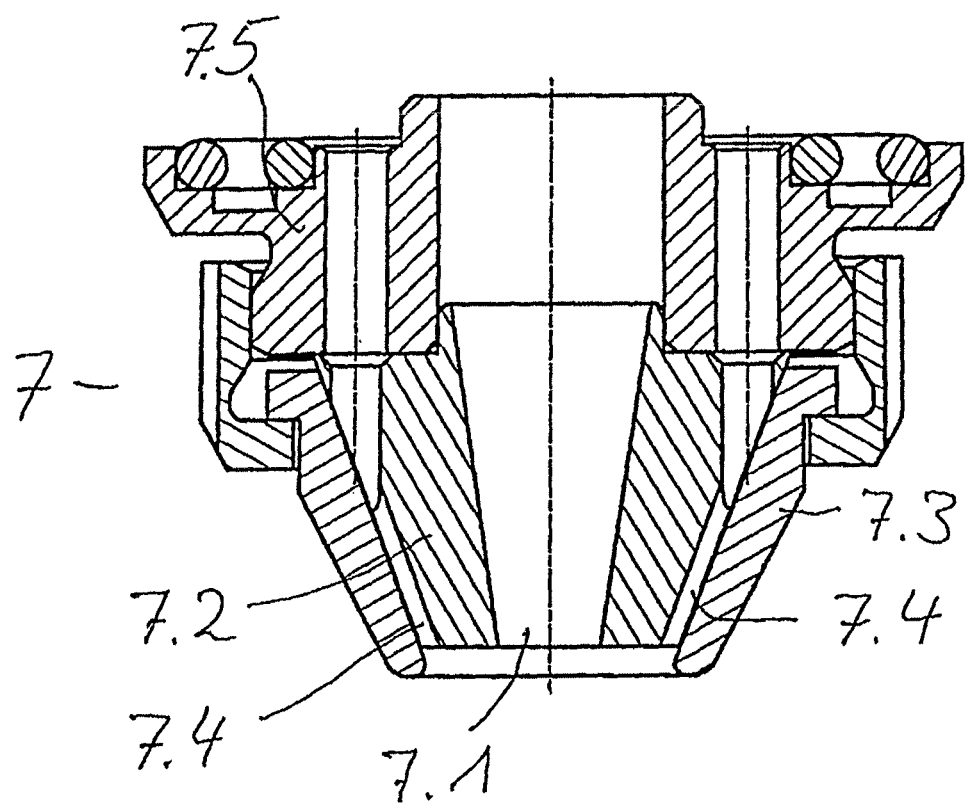

There are shown:

FIGS. 1a and 1b perspective representations of an example of a system in accordance with the invention;

FIG. 2 a sectional representation through the example shown in FIG. 1;

FIGS. 3a and 3b a coupling module which is connected to a beam guiding module in a sectional representation;

FIG. 4 a perspective representation of a holding element with protective glass;

FIG. 5 a perspective representation of an example of a support element such as can be used at a system in accordance with the invention; and FIG. 6 a sectional representation of a nozzle fastenable to a processing module.

An example of a system in accordance with the invention is shown in FIGS. 1 and 2. This example is formed with a plurality of modules. In this respect, a laser beam 1, which is emitted from a beam source, not shown, is directed into a coupling module 2. An element 2.1 collimating the laser beam 1 is arranged in the coupling module 2. A laser beam 1 already otherwise collimated can, however, also be directed into the coupling module 2. A two-dimensional cross-table 2.2 is present at the coupling module 2 for an adjustment of the laser beam 1.

Furthermore, in this example, a reflective element 2.3 is arranged in the coupling module 2 inclined at an angle of 45° with which the beam radiation direction of the laser beam 1 is varied by 90°. The coupling module 2 is fastened to a holding element 15 and is connected to an extension module 3 which is in turn connected to a further extension module 3. Both extension modules 3 are of equal length and are hollow in the interior. The collimated laser beam 1 is conducted through the hollow space and is incident onto an element 4 which focuses the laser beam 1 and is fixed in a beam guiding module 5. The beam guiding module 5 is connected at one side to the extension module 3 arranged at the left here.

The beam guiding module 5 is connected to the processing module 6 at the other side. In the processing module 6, a further reflective element 6.1 is arranged onto which the focused laser beam 1 is incident and is deflected by 90° in the direction of a surface to be processed.

A nozzle 7 in which a discharge opening 7.1 for the laser beam 1 and for the protective gas is formed is fastened to the processing module 6. In addition, passages 7.4 which cannot be recognized are present here via which powdery welding material can be conveyed into the focal point of the laser beam 1 on the workpiece surface to be processed.

In this example, a plurality of passages via which powdery welding material, coolant and protective gas can be supplied from connections 8, 9 and 10 are conducted through the extension modules 3, the beam guiding module 5 and up to and into the processing module 6. The passages are formed in the walls of these modules parallel to the beam axis of the laser beam 1 which is directed through the modules 3 and 5 and are not recognizable in the representation. In this respect, a separate connection 8, 9 and 10 as well as an outflow for coolant are present for each of these passages.

Since this example enables an immersion depth into the interior of a workpiece to be processed of more than 900 mm, a support element 12 is attached to the beam guiding module 5 and can be placed onto the workpiece surface to be processed and can form a loose bearing.

In addition, an adjustment mechanism 4.1 is present with which the focal length of the focusing element 4 can be adapted to the respective spacing of the beam axis of the laser beam 4 which runs through the modules 3 and 5 and to the workpiece surface to be processed.

In the perspective view of FIG. 1a, a mount 16 for a holding element 13 which receives a protective glass 13.1 is present at the end face of the processing module 6 arranged at the left; they are shown individually in FIG. 4. The holding element 13 can be introduced into the mount of the processing module 6 together with the protective glass 13.1 so that the protective glass 13.1 is arranged between the discharge opening 7.1 of the nozzle 7 and the reflective element 6.1 and protects the latter. The reflective element 6.1 is a copper mirror with a smooth planar surface and can be cooled via cooling passages not recognizable here.

The conducting of protective gas into the interior should now be illustrated by the sectional representation shown in FIG. 3a through the beam guiding module 5 and the processing module 6. The protective gas can be discharged from the passage 14 into the interior of the beam guiding module 5 and can there form a flow which runs past the one side of the focusing element 4 and then in the direction of the processing module 6, which is indicated by the dashed line extent of the flow. The protective gas also flows over the reflective element 6.1 for its additional cooling and cleaning. The protective gas flow is conducted from there around the holding element 13. So that the protective glass 13.1 held therein can be flowed over at both surfaces. Subsequently, the protective gas can be discharged from the discharge opening 7.1 of the nozzle 7 and satisfy its actual protective function in overlay welding.

It becomes clear from the passages 16 for coolant recognizable in FIG. 3b and formed in the beam guiding module 5 and in the processing module 6 that an effective cooling of especially the processing module 6 with the additional elements present therein is possible. Coolant can in this respect be guided, in a manner not shown, through the extension modules 3 to passages 16 through the beam guiding module 5 through the processing module 6 to the rear side of the reflective element 6.1; in this respect, the reflective element 6.1 can be cooled in direct contact with the coolant. In a form not shown here, the passage 16 can, however, also be conducted alone or, as described above, subsequent to the cooling of the reflective element (6.1) onward to an adapter element 7.5 which is not shown in FIG. 3b and with which a cooling of a nozzle 7 can be achieved by heat exchange. The coolant can subsequently again be conducted back via a return passage (not shown) through all modules 6, 5 and 3 and can be used again for cooling, optionally after a cooling in a circuit. An adapter element 7.5 for the cooling of the nozzle 7 is arranged above the two parts 7.2 and 7.3 of the nozzle 7 in the example shown in FIG. 6.

As already addressed, a holding element 13 for a protective glass 13.1 can be inserted at a processing module 6. An advantageous example is shown in FIG. 4. The protective glass 13.1 can be inserted into a mount between two frame elements 13.2 and can thus be held between the two frame elements 13.2. The holding element 13 can be pulled out of the processing module 6 for a required replacement of a contaminated protective glass 13.1. Since the two frame elements 13.2 are connected to one another by means of an axle of rotation 13.2 at an end face, both frame elements 13.2 can be flipped open by a pivot movement so that the protective glass 13.1 becomes accessible and the old one can be removed and a new one inserted. The frame elements 13.2 are then again folded together and the holding element 13 can again be introduced into the mount present at the processing module 6 toward the abutment 13.4 formed on the holding element 13. A very inexpensive protection for the interior of the processing module 6 and in particular for the reflective element 6.1 as well as the focusing element 4 can thus be achieved.

An example for a support element 12 is shown in FIG. 5 which can be fastened to one or more of the modules. The support element 12 is formed with a sleeve-like part 12.1 which has a bore through which a part of a ball 12.2 can project. The sleeve-like part 12.1 holds the ball 12.2 and forms a part of a support for the ball 12.2 which can thus rotate. The sleeve-like part can be designed so that it can be moved out like a telescope or can also be provided with a thread by which the length can be changed so that an adaptation to different spacings from a surface of a workpiece to be processed is possible.

FIG. 6 shows a section through a nozzle 7 which can be fastened to the processing module 6. Differently designed or dimensioned nozzles 7 can be replaced easily by means of a screw connection and a respective suitable nozzle 7 can thereby be used for different processes or workpieces.

A perforation having the discharge opening 7.1 for the laser beam 1 and protective gas is present at the nozzle 7. Both are formed in an inner conical part 7.2 which can be connected to an outer conical part 7.3 by means of a cap nut. The regions of the outer jacket surface of the inner conical part 7.2 facing in the direction of the surface to be processed and the inwardly facing jacket surface of the outer conical part 7.3 are formed conically and complementarily to one another. Groove-like recesses are formed at the two jacket surfaces and form passages, on a corresponding alignment of the parts 7.2 and 7.3 relative to one another, via which powdery welding material can be conveyed onto the workpiece surface to be processed into the focal point of the laser beam 1. Two of a total of four of the passages 7.4 can be recognized here which are present at the nozzle 7 and which are arranged at an angular spacing of a respective 90° relative to one another.

For an adaptation to different spacings of the surface to be processed, as already addressed in the general part of the description, it is also possible to proceed so that parts of a nozzle 7 can be replaced which can then, for example as in the example shown in FIG. 6, be fastened using the same cap nut. The two parts 7.2 and 7.3 can thus, as required, be replaced with other parts 7.2 and 7.3 which have a different conical angle at the jacket surfaces at which the groove-like recesses for the passages 7.4 are formed.

The invention claimed is:

1. A modular system for overlay welding at inwardly disposed surfaces of workpieces comprising a laser beam, a feed for powdery welding material as well as a respective feed for protective gas and for a coolant,
    characterized in that the system is formed with a coupling module (2) for the laser beam (1), at least one beam guiding module (5) for the laser beam (1) and with a processing module (6), which can be connected to one another, wherein
    a collimated laser beam (1) is directed via the coupling module (2) through the beam guiding module(s) (5) onto an optical element (4) focusing the laser beam (1) onto the surface of a workpiece to be processed and a nozzle (7) is present at the processing module (6) and has a discharge opening (7.1) for the laser beam (1) and the protective gas and at least one passage (7.4) is present having a discharge opening for powdery welding material.

2. A system in accordance with claim 1, characterized in that the passage(s) (7.4) for powdery welding material is/are aligned at an angle at the nozzle (7) so that powdery welding material is incident onto the surface of the workpiece to be processed into the spot of the laser beam (1).

3. A system in accordance with claim 1, characterized in that the discharge openings of the passages (7.4) for powdery welding material are arranged at the same respective angular intervals from one another.

4. A system in accordance with claim 1, characterized in that the beam guiding module (5) and the processing module (6) can be connected to at least one extension module (3).

5. A system in accordance with claim 1, characterized in that connections (8 to 10) for the feed of protective gas, powdery welding material and a coolant are present at the coupling module (2), extension module (3) and/or beam guiding module (5) and passages for powdery welding material, protective gas and coolant (16) are led through at least the beam guiding module (5) and the processing module (6) and in this respect protective gas is conducted to the discharge opening (7.1) of the nozzle (7) and powdery welding material is conducted to the passage(s) (7.4) of the nozzle (7).

6. A system in accordance with claim 1, characterized in that an element (6.1) is present in the processing module (6) which reflects the laser beam (1) and with which the laser beam (1) can be deflected via the discharge opening (7.1) of the nozzle (7) onto the surface of a workpiece to be processed.

7. A system in accordance with claim 1, characterized in that a protective glass (13.1) is arranged within the processing module (6) between the discharge opening (7.1) of the nozzle (7) and the reflective element (6.1).

8. A system in accordance with claim 7, characterized in that the protective glass (13.1) is held in a holding element (13) and the holding element (13) is releasably connected to the processing module (6).

9. A system in accordance with claim 8, characterized in that the protective glass (13.1) is held in the holding element (13) by means of two frame elements (13.2) which are pivotable about an axis of rotation.

10. A system in accordance with claim 1, characterized in that an element (4) focusing the laser beam (1) is received in the beam guiding module (5) and/or in an extension module (3).

11. A system in accordance with claim 1, characterized in that the focal length of the focusing element (4) is variable.

12. A system in accordance with claim 1, characterized in that the laser beam (1) can be focused by the reflective element (6.1) arranged in the processing module (6).

13. A system in accordance with claim 1, characterized in that a separate connection and, by the beam guiding module (5) and the extension module(s) (3), a separate passage are associated with each passage (7.4) for powdery welding material in the processing module (6) and in the nozzle (7).

14. A system in accordance with claim 1, characterized in that a support element (12) is arranged at the beam guiding module (5) and/or at least one extension module (3).

15. A system in accordance with claim 14, characterized in that the support element (12) is formed by means of a rotatably supported ball (12.1), a roll or a wheel.

16. A system in accordance with claim 14, characterized in that the support element (12) is made in the manner of a telescope or is fastened to a telescope.

17. A system in accordance with claim 1, characterized in that nozzles (7) or parts (7.2 and 7.3) of a nozzle (7) are replaceably fastened to the processing module (6) in which the passage(s) (7.4) for powdery welding material is/are inclined at different angles.

18. A system in accordance with claim 1, characterized in that the system with the processing module (6) and/or a workpiece are movable in at least two axes relative to one another.

19. A system in accordance with claim 1, characterized in that the protective gas is conducted into the beam guiding module (5), into an extension module (3) or into the processing module (6) directly after or before the element (4) focusing the laser beam (1).

20. A system in accordance with claim 1, characterized in that protective gas is conducted past the reflective element (6.1) in the processing module (6) and the protective glass (13.1) through the discharge opening (7.1) for the laser beam (1).

21. A system in accordance with claim 1, characterized in that a two-dimensional cross-table (2.2) is arranged at the coupling module (2) for adjusting the laser beam (1).

22. A system in accordance with claim 1, characterized in that coolant is conducted through passages (16) via the beam guiding module (15) into the processing module (6) for cooling the reflective element (6.1) and/or the nozzle (7).

23. A system in accordance with claim 22, characterized in that the rear side of the reflective element (6.1) is coolable with coolant in direct contact.

24. A system in accordance with claim 22, characterized in that coolant for cooling the nozzle (7) is conducted into an adapter element (7.5) at the processing module (6).

* * * * *

UNITED STATES PATENT AND TRADEMARK OFFICE
CERTIFICATE OF CORRECTION

| | | |
|---|---|---|
| PATENT NO. | : 8,809,730 B2 | |
| APPLICATION NO. | : 13/376906 | |
| DATED | : August 19, 2014 | |
| INVENTOR(S) | : Steffen Nowotny et al. | |

It is certified that error appears in the above-identified patent and that said Letters Patent is hereby corrected as shown below:

On the title page, inventor item (75), change "Kublech" to --Kubisch--.

Signed and Sealed this
Thirty-first Day of March, 2015

Michelle K. Lee
*Director of the United States Patent and Trademark Office*